(No Model.) 2 Sheets—Sheet 2.
S. M. PRYOR.
FRAME FOR MOWING AND HARVESTING MACHINES.
No. 462,996. Patented Nov. 10, 1891.
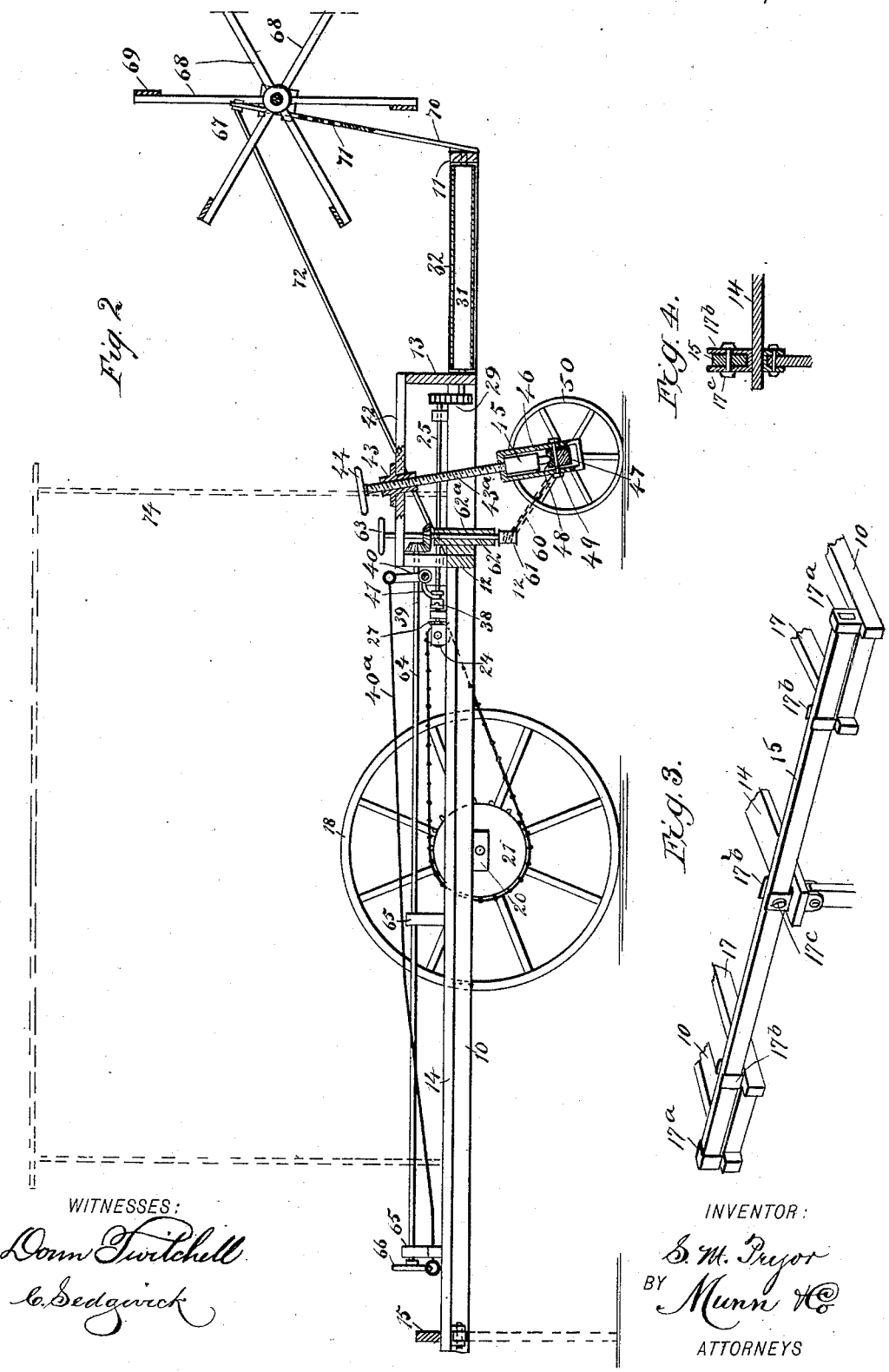
WITNESSES:
Donn Twitchell
C. Sedgwick
INVENTOR:
S. M. Pryor
BY Munn & Co
ATTORNEYS

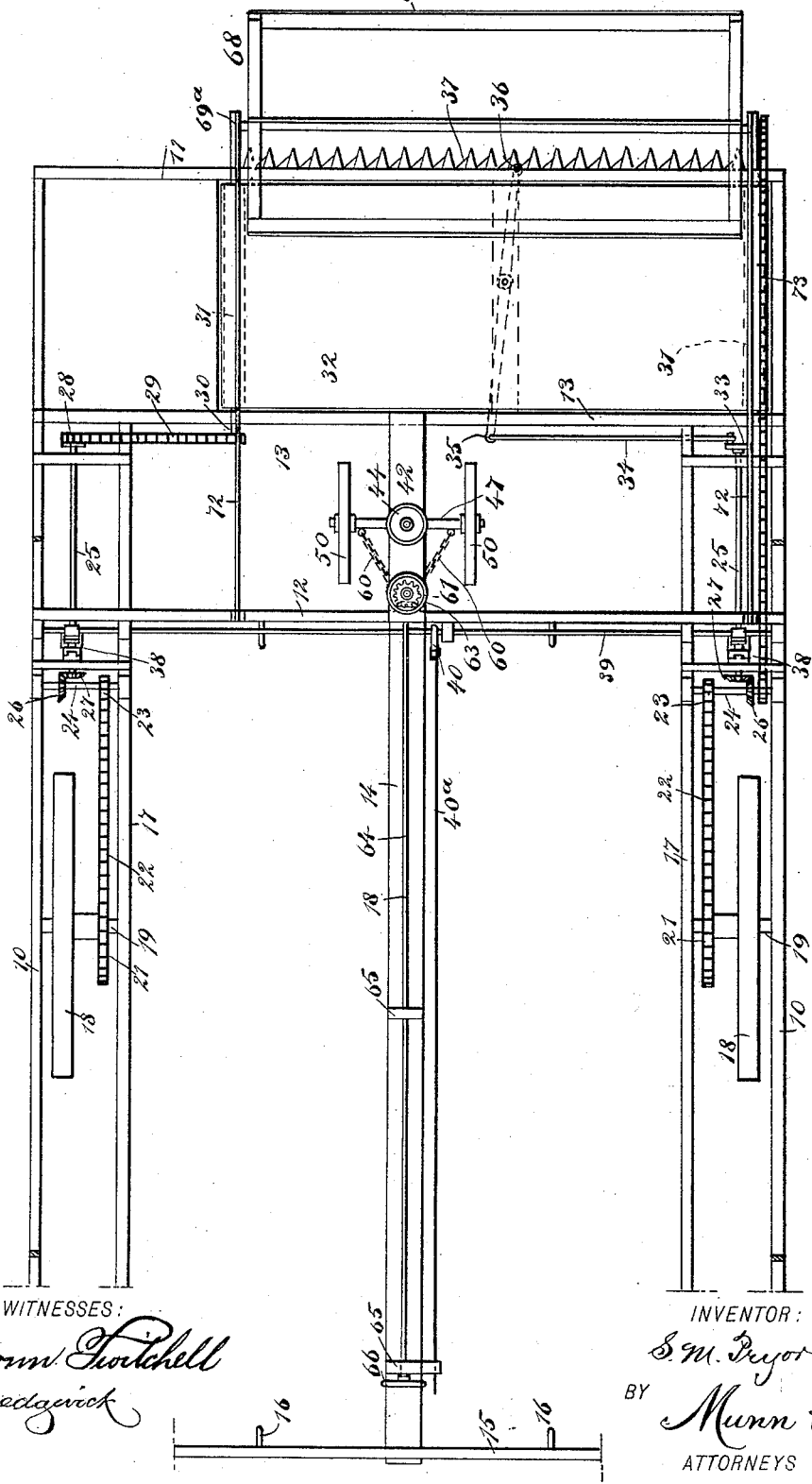

UNITED STATES PATENT OFFICE.

SAMUEL M. PRYOR, OF NEW CASTLE, KENTUCKY.

FRAME FOR MOWING AND HARVESTING MACHINES.

SPECIFICATION forming part of Letters Patent No. 462,996, dated November 10, 1891.

Application filed April 29, 1891. Serial No. 390,930. (No model.)

*To all whom it may concern:*

Be it known that I, SAMUEL M. PRYOR, of New Castle, in the county of Henry and State of Kentucky, have invented a new and Improved Frame for Mowing and Harvesting Machines, of which the following is a full, clear, and exact description.

My invention relates to improvements in the construction of frames for mowing and harvesting machines, and especially for a front-cut reaper and mower. These frames as usually constructed are heavy and cumbersome and are difficult to get together; and the object of my invention is to produce an extremely simple and durable frame which may be easily built, and which is constructed in such a manner that the various parts of the machinery may be easily attached to it, and also to provide means for placing the machine under the easy control of the driver.

To this end my invention consists in certain features of construction and combination of parts, which will be hereinafter fully described, and pointed out in the claims.

Reference is to be had to the accompanying drawings, forming a part of this specification, in which similar figures of reference indicate corresponding parts in both views.

Figure 1 is a broken plan view of a frame embodying my invention, showing the manner in which the accompanying parts of the reaper and mower are attached. Fig. 2 is a vertical longitudinal section of the same. Fig. 3 is a broken perspective view showing the manner in which the cross-strip or draw-bar is secured to the main frame; and Fig. 4 is a broken sectional view of the same, the section being taken through the cross-strip or draw-bar.

The main frame is of an approximately-rectangular shape, and comprises side pieces 10, which are preferably beveled on the under side, the cross-strip 11, connecting the front ends of the side pieces, and the cross-bars 12 and 13, which are placed near the front portion of the frame and which are parallel. The cross-bar 13 is made somewhat wider or deeper than the cross-bar 12 to facilitate the attachment of the surrounding parts, as hereinafter described.

A center beam or tongue 14 extends rearward from the cross-bar 12, to which it is attached, the said tongue being located midway between the side pieces of the frame, and being arranged parallel therewith, and the rear end of the tongue is preferably provided with a supporting-leg which is pivoted to it, as shown in dotted lines in Fig. 2. A removable cross-strip 15 is adapted to connect the rear ends of the side pieces 10 of the frame, and to connect with the rear end of the tongue 14, and this cross-strip is provided with suitable links or hooks 16, which are arranged on opposite sides of the tongue 14, and to which the whiffletrees may be secured.

Near each side of the frame are beams 17, which are arranged parallel with the side pieces 10 and just inside the same, and it will be seen that a space is formed between each of the beams 17 and tongue 14 for a horse. These beams 17 are secured at their forward ends to the cross-bar 13, and also are attached to the cross-bar 12.

A convenient means of attaching the cross-strip 15 to the main frame is shown in Figs. 3 and 4. The side pieces 10 have at their rear ends keepers $17^a$ to receive the ends of the cross-strip. The beams 17 and tongue 14 have at their rear ends U-shaped keepers $17^b$ to embrace the cross-strip, and a bolt $17^c$ extends through the central U-shaped keeper and through the cross-strip and prevents the displacement of the latter.

On opposite sides of the machine-frame are the main driving-wheels 18, which are secured to axles 19, and these axles are mounted in boxes 20 on the under side of the side pieces 10 and side beams 17, the axles 19 extending transversely between the side pieces and the side beams. Each axle 19 is provided with a sprocket-wheel 21, which connects by means of a chain 22 with a sprocket-wheel 23, the latter sprocket-wheel being secured to a transverse shaft 24, which is mounted between the side piece 10 and side beam 17 on each side of the machine. Extending longitudinally forward from a point adjacent to the shafts 24 are shafts 25, which are connected to the shafts 24 by means of beveled pinions 26 and 27. The shaft 25 on one side of the machine is provided at its forward end with a sprocket-wheel 28, from which extends inwardly a chain-belt 29, which belt is connected with a sprocket-wheel on a shaft 30, and this shaft carries one of the rollers 31 which supports and carries the traveling belt 32, which belt carries the grain to the binder. This traveling belt 32 runs transversely in the frame between the cross-bar 13 and the cross-strip 11 at the front end of the machine, and the driving-roller 31 of the belt is arranged near one side of the machine, space being left between the roller and the adjacent side of the frame for a common form of binder. The shaft 25 on the opposite side of the frame is provided at its forward end with a crank-pulley 33, which connects, by means of an inwardly-extending pitman 34, with the rear end of a lever 35, which lever is pivoted in the frame and extends forward and connects, as shown at 36, with a cutter-bar 37, which cutter-bar is arranged on the front strip 11. The cutter-bar may be of any approved construction, and it will be observed that when the pitman 34 is actuated by the crank-pulley it will move the lever 35 backward and forward, and thus impart a reciprocating movement to the knives of the cutter-bar.

The shafts 25 are each provided near their rear ends with common forms of clutches 38, by means of which they may be thrown into and out of gear, and these clutches are operated by the following mechanism: A rod 39 extends transversely across the frame, being held in suitable supports on the back of the cross-bar 12, and the rod is provided near the center with an upwardly-extending arm 40, by means of which it may be oscillated. Near each end of the bar is a depending arm 41, and each arm engages a clutch 38. The arm 40 connects with a rod $40^a$, which extends along the top of the tongue 14 to the rear of the machine, and by means of the rod the arm 40 and rod 39 may be oscillated, so as to throw the cutting mechanism and conveyer-belt in or out of gear.

The cross-bars 12 and 13 are connected near the center by a support 42, which is firmly secured to the upper side of said bars and should be strongly braced, as it supports a greater part of the weight of the machine, as will appear below. This support 42 has centrally thereon a threaded sleeve 43, and extending downwardly and forwardly through this sleeve is a screw $43^a$, which fits the thread of the sleeve and which terminates at its upper end in a hand-wheel 44. The lower end of the screw enters a tube 46, and swivels therein by means of its collar or head 45, which prevents its removal from the tube. Extending transversely through the tube is an axle 47, having a strengthening-strip 48 on its upper side, and in which is a central socket receiving the lower rounded end of the screw $43^a$ below its collar or head 45. A transverse bolt 49 prevents longitudinal movement of the axle through the tube. When the screw-shaft $43^a$ is rotated by means of its hand-wheel, it will turn in the sleeve and swivel in the tube and thus raise or lower the frame, as the case may be. The axle 47 is provided at each end with a small wheel 50, which is preferably of metal, and a chain 60 is connected to the axle near each end and extends rearward around a pulley 61, which pulley is fixed to the lower end of a vertical shaft 62, the said shaft being mounted in suitable bearings and extending upward through the support $62^a$ and terminating in a hand-wheel 63. The shaft 62 is also geared to a horizontal shaft 64, which shaft is mounted in suitable supports 65 on the tongue 14 and extends rearward to a point where it may be conveniently reached from the rear of the machine and which terminates in a hand-wheel 66.

The shaft 62 is used in steering the machine, and by turning the shaft to the right or left the chain 60 will be passed around the pulley 61 and will turn the axle 47 and wheels 50, so as to guide the machine in a desired direction, and it will be noticed that the shaft 62 may be either turned directly by the hand-wheel 63 or indirectly by the hand-wheel 66 and rod 64, so that the machine may be steered by the driver either when he is in front or rear of his horses.

A reel 67 is mounted on the front portion of the frame, the reel consisting of a series of radially-extending arms 68, which are secured to a suitable hub, and a series of cross-strips 69, connecting the outer ends of the transversely aligning arms. The reel is supported in uprights 70, which are secured to the front portion of the main frame by suitable bolts, and the upper ends of these uprights are provided with a series of vertically-aligning holes, as shown at 71, so that the reel may be adjusted vertically in them. The reel is also strengthened by end braces 72, which are secured to the upper portion of the uprights 70, and which extend rearward and are attached to the main frame. The reel is driven by a sprocket-chain 73, which connects with a sprocket-wheel on one end of the reel-shaft $69^a$ and at its rear end with a sprocket-wheel on one of the shafts 24.

If desired, the frame may be provided with a canopy-top, as shown at 74, to protect the horses from the sun.

It will thus be seen that any ordinary reaping and binding or mowing machinery may be secured in the frame, and it will be noticed that the frame may be very quickly and easily adjusted, so as to bring it into a desired vertical position by means of the screws $43^a$, as this supports the front portion of the machine.

When the machine is to be used, a pair of horses or other animals are placed within the frame, there being one on each side of the tongue 14, and the horses are connected with the rear cross-strip 15 by means of whiffletrees secured to the links 16.

Having thus described my invention, I claim as new and desire to secure by Letters Patent—

1. A frame of the character described, comprising parallel side pieces connected at the front by a cross-strip, cross-bars extending transversely between the side pieces near the front end, side beams extending rearward from the cross-bars and parallel with the side pieces, a tongue extending rearwardly from the rear cross-bar, and a removable cross-strip adapted to connect the rear ends of the side pieces and side beams and the rear end of the tongue, substantially as described.

2. The combination, with the harvester or mower frame provided with drive-wheels, a threaded sleeve 43, mounted on the frame, a screw-shaft $43^a$, extending down through the sleeve and having a collar or head 45 near its rounded lower end, a tube in which the lower end of the screw swivels by means of said head or collar, an axle passing transversely through the tube and having a central socket in which rests the grounded lower end of the screw and wheel on said axle, of a steering-shaft and connections between the axle and the steering-shaft, substantially as set forth.

3. A device of the character described, comprising a rectangular frame having a central tongue, a rear draw-bar, and the usual cutting and conveying mechanism, driving-wheels supporting the rear portion of the frame and adapted to drive the mechanism thereon, steering-wheels to support the front end of the frame, a pulley-and-chain mechanism for turning the wheels, and a screw mechanism for adjusting the frame vertically in relation to the steering-wheels, substantially as described.

SAMUEL M. PRYOR.

Witnesses:
 A. O. SANFORD,
 J. LEE BRUCE.